(12) United States Patent
Seo et al.

(10) Patent No.: US 11,228,714 B2
(45) Date of Patent: Jan. 18, 2022

(54) CAMERA MODULE

(71) Applicant: SAMSUNG ELECTRO-MECHANICS CO., LTD., Suwon-si (KR)

(72) Inventors: Bo Sung Seo, Suwon-si (KR); Nam Ki Park, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/084,884

(22) Filed: Oct. 30, 2020

(65) Prior Publication Data
US 2021/0227141 A1   Jul. 22, 2021

(30) Foreign Application Priority Data

Jan. 16, 2020 (KR) .................. 10-2020-0006126

(51) Int. Cl.
*H04N 5/232* (2006.01)
*H04N 5/225* (2006.01)
(Continued)

(52) U.S. Cl.
CPC ..... *H04N 5/23287* (2013.01); *G02B 13/0015* (2013.01); *G02B 27/646* (2013.01);
(Continued)

(58) Field of Classification Search
None
See application file for complete search history.

(56) References Cited

U.S. PATENT DOCUMENTS

| 6,101,033 | A | * | 8/2000 | Kuno | G02B 27/646 |
| | | | | | 359/554 |
| 2013/0128360 | A1 | * | 5/2013 | Minamisawa | H04N 5/2252 |
| | | | | | 359/554 |

(Continued)

FOREIGN PATENT DOCUMENTS

| JP | 2009-288769 A | 12/2009 |
| JP | 6214247 B2 | 9/2017 |

(Continued)

OTHER PUBLICATIONS

Korean Office Action dated Feb. 23, 2021 in counterpart Korean Patent Application No. 10-2020-0006126 (5 pages in English, 5 pages in Korean).

*Primary Examiner* — William B Perkey
(74) *Attorney, Agent, or Firm* — NSIP Law

(57) ABSTRACT

A camera module includes a movable member, a holder, a fixing frame, a movable frame, and a first support frame. The movable member includes a lens module. The holder is coupled to the movable member and includes a magnet member. The fixing frame is configured to accommodate the holder and includes a coil member configured to face the magnet member. The movable frame is mounted on the holder and includes a pivot portion. The first support frame is configured to surround an upper surface portion of the pivot portion and a second support frame is configured to surround a lower surface portion of the pivot portion. The first support frame and the second support frame are respectively mounted on the fixing frame, and the movable frame is rotatably disposed around the pivot portion.

16 Claims, 5 Drawing Sheets

(51) Int. Cl.
  *G02B 13/00* (2006.01)
  *G03B 5/06* (2021.01)
  *G03B 5/00* (2021.01)
  *G02B 27/64* (2006.01)

(52) U.S. Cl.
  CPC .............. *G03B 5/00* (2013.01); *G03B 5/06* (2013.01); *H04N 5/2252* (2013.01); *H04N 5/225251* (2018.08); *G03B 2205/0023* (2013.01); *G03B 2205/0069* (2013.01)

(56) References Cited

U.S. PATENT DOCUMENTS

| | | | |
|---|---|---|---|
| 2014/0362284 A1 | 12/2014 | Shin et al. | |
| 2015/0153584 A1* | 6/2015 | Yasuda | G02B 27/646 |
| | | | 359/557 |
| 2015/0215541 A1 | 7/2015 | Nomura et al. | |
| 2015/0277138 A1* | 10/2015 | Yanagisawa | B23K 26/32 |
| | | | 359/554 |
| 2018/0224665 A1* | 8/2018 | Im | G02B 7/021 |
| 2018/0364450 A1* | 12/2018 | Lee | G02B 7/1805 |
| 2019/0124237 A1* | 4/2019 | Watanabe | H04N 5/2328 |
| 2020/0292841 A1* | 9/2020 | Sakae | H04N 5/23287 |
| 2021/0227141 A1* | 7/2021 | Seo | H04N 5/2252 |

FOREIGN PATENT DOCUMENTS

| | | |
|---|---|---|
| KR | 10-2010-0092822 A | 8/2010 |
| KR | 10-2014-0144126 A | 12/2014 |
| KR | 10-2015-0091010 A | 8/2015 |

\* cited by examiner

CAMERA MODULE

CROSS-REFERENCE TO RELATED APPLICATION(S)

This application claims the benefit under 35 USC 119(a) of Korean Patent Application No. 10-2020-0006126 filed on Jan. 16, 2020, in the Korean Intellectual Property Office, the entire disclosure of which is incorporated herein by reference for all purposes.

BACKGROUND

1. Field

The following description relates to a camera module.

2. Description of Related Art

Recently, camera modules have been adopted in mobile communication terminals such as smartphones, tablet PCs, and laptops.

In addition, such a camera module is provided with an actuator for moving the lens module, to perform focus adjustment and image stabilization, and the actuator generally moves the lens module in the direction of the optical axis and in a direction perpendicular to the optical axis by driving force of a magnet and a coil.

However, since the shaking occurring in the camera module does not always occur in the direction perpendicular to the optical axis, when the lens module is moved in the direction perpendicular to the optical axis, there is a limit to the shaking correction.

In particular, it may be difficult to precisely correct for shaking or inadvertent hand movement that may constantly occur during video recording, for example.

In addition, when the lens module is moved in a direction perpendicular to the optical axis, since a configuration for supporting the lens module, such as plurality of ball members and guide grooves, may be desired, there may be a problem in which the height of the camera module in the optical axis direction increases.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a movable member, a holder, a fixing frame, a movable frame, and a first support frame. The movable member includes a lens module. The holder is coupled to the movable member and includes a magnet member. The fixing frame is configured to accommodate the holder and includes a coil member configured to face the magnet member. The movable frame is mounted on the holder and includes a pivot portion. The first support frame is configured to surround an upper surface portion of the pivot portion and a second support frame is configured to surround a lower surface portion of the pivot portion. The first support frame and the second support frame are respectively mounted on the fixing frame, and the movable frame is rotatably disposed around the pivot portion.

The movable frame may be rotatable about three axes.

The magnet member may include a first magnet, a second magnet, and a third magnet, and the coil member may include a first coil, a second coil, and a third coil. The first magnet and the first coil may be configured to rotatably drive the movable frame about an optical axis. The second magnet and the second coil may be configured to rotatably drive the movable frame about a first axis, perpendicular to the optical axis. The third magnet and the third coil may be configured to rotatably drive the movable frame about a second axis, perpendicular to both the optical axis and the first axis.

The first magnet may have a first polarity and a second polarity, magnetized in a direction perpendicular to the optical axis. The second magnet and the third magnet may each have a first polarity and a second polarity magnetized in the optical axis direction.

The first support frame may include a first support groove having a tetrahedral shape protruding on a first surface of the first support groove and sunken on another surface of the first support groove. The first support groove may have three points in contact with the pivot portion.

The second support frame may include a second support groove having a tetrahedral shape protruding on a first surface of the second support groove and sunken on another surface of the second support groove. The second support groove may have three points in contact with the pivot portion.

The first support groove and the second support groove may be opposingly disposed to accommodate the pivot portion.

The first support frame and the second support frame may be pressed to the pivot portion.

The first support frame may include a first body portion having a first support groove surrounding the pivot portion, and an extension portion extending obliquely from both sides of the first body portion. The second support frame may include a second body portion having a second support groove surrounding the pivot portion and a through-hole provided in the second body portion. The extension portion may pass through the through-hole from an upper side of the second body portion towards a lower side of the second body portion.

The movable frame may extend in a first axis direction perpendicular to an optical axis. The first support frame and the second support frame may respectively extend in a second axis direction perpendicular to both the optical axis and the first axis.

The pivot portion may be configured to have a spherical shape.

The holder may include a stopper portion protruding in a direction perpendicular to an optical axis.

The movable member may include a housing configured to accommodate the lens module. The lens module may be disposed to be movable relative to the housing in an optical axis direction.

In another general aspect, a camera module includes a movable member, a holder, a fixing frame, a first support frame, a second support frame, and a movable frame. The movable member includes a lens module. The holder is coupled to the movable member and has a magnet member. The fixing frame is configured to accommodate the holder and includes a coil member configured to face the magnet member. The first support frame and the second support frame are mounted on the fixing frame and spaced apart from each other along an optical axis. The movable frame is mounted on the holder and disposed between the first support frame and the second support frame. The movable frame is provided with a ball member protruding to respectively contact the first support frame and the second support frame. The movable frame is rotatably disposed, along with the movable member and the holder, around the ball member.

The movable frame, together with the movable member and the holder, may be rotatable about three axes. The movable member may include a housing configured to accommodate the lens module. The lens module may be disposed to be movable relative to the housing in the optical axis direction.

The housing may be provided with an image sensor module coupled thereto, wherein the image sensor module includes an image sensor and a printed circuit board on which the image sensor is mounted. The image sensor module, together with the movable member, may be rotatable about three axes.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
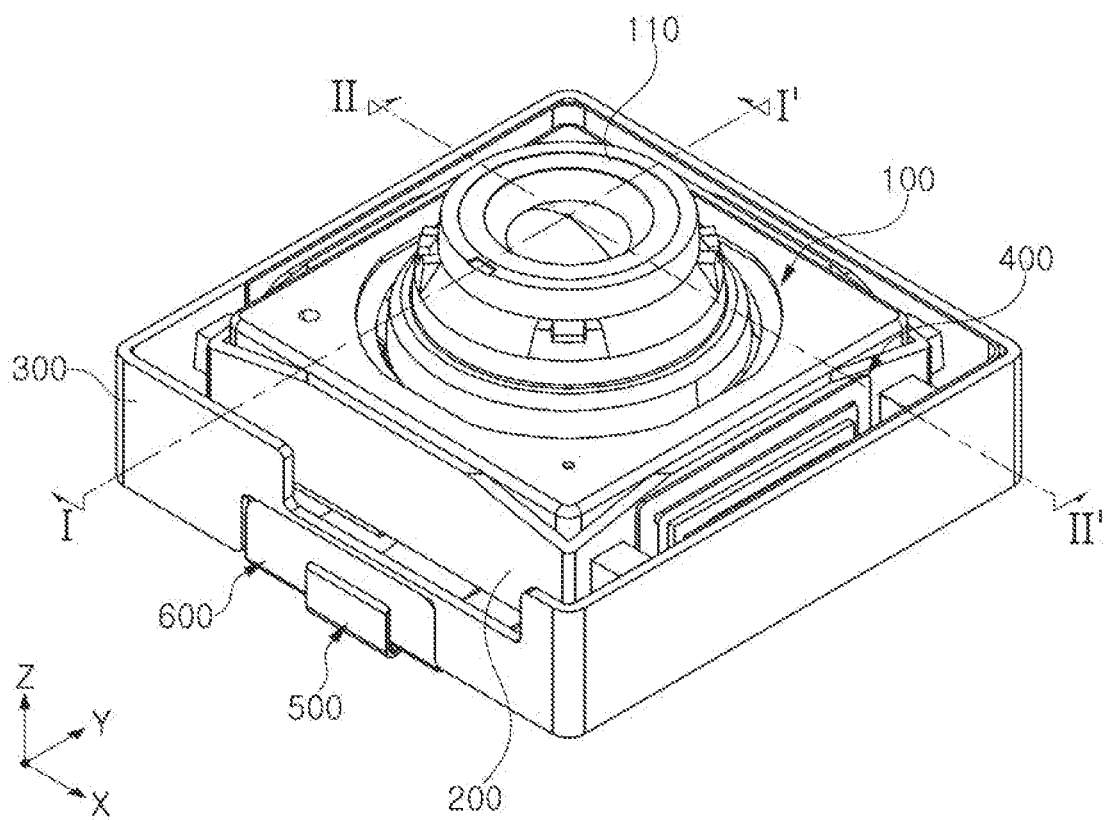
FIG. 1 is a perspective view of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an embodiment or example, e.g., as to what an embodiment or example may include or implement, indicates that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

A camera module 1, according to an example, may be provided in a portable electronic device, such as a mobile communication terminal, a smartphone, a tablet PC, or the like.

Figure 2:
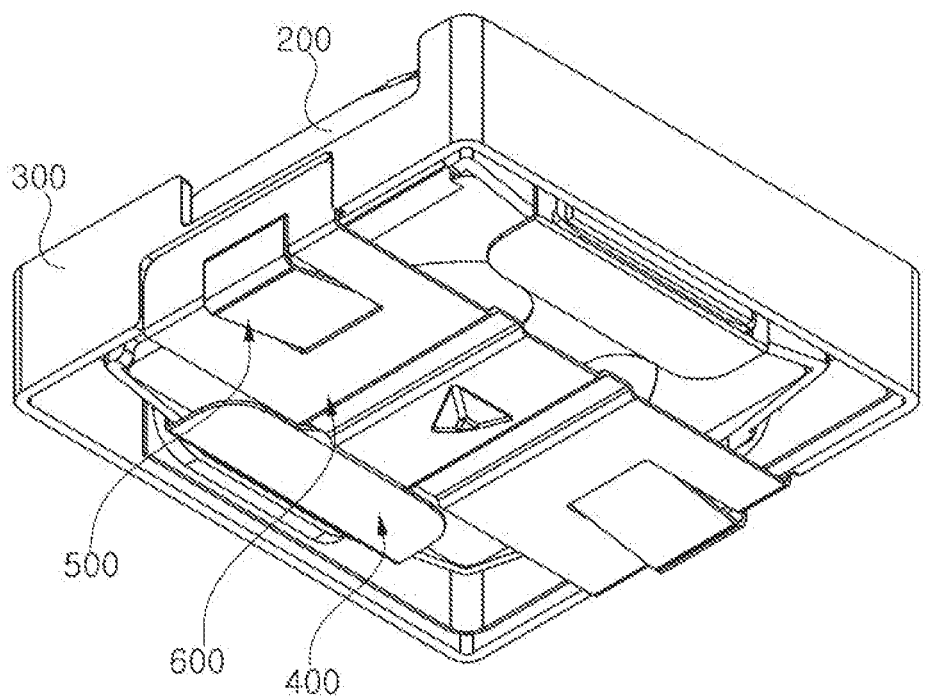
FIG. 2 is a bottom perspective view of a camera module according to an example.

FIG. 1 is a perspective view of a camera module according to an example, and FIG. 2 is a bottom perspective view of a camera module according to an example.

Figure 3:
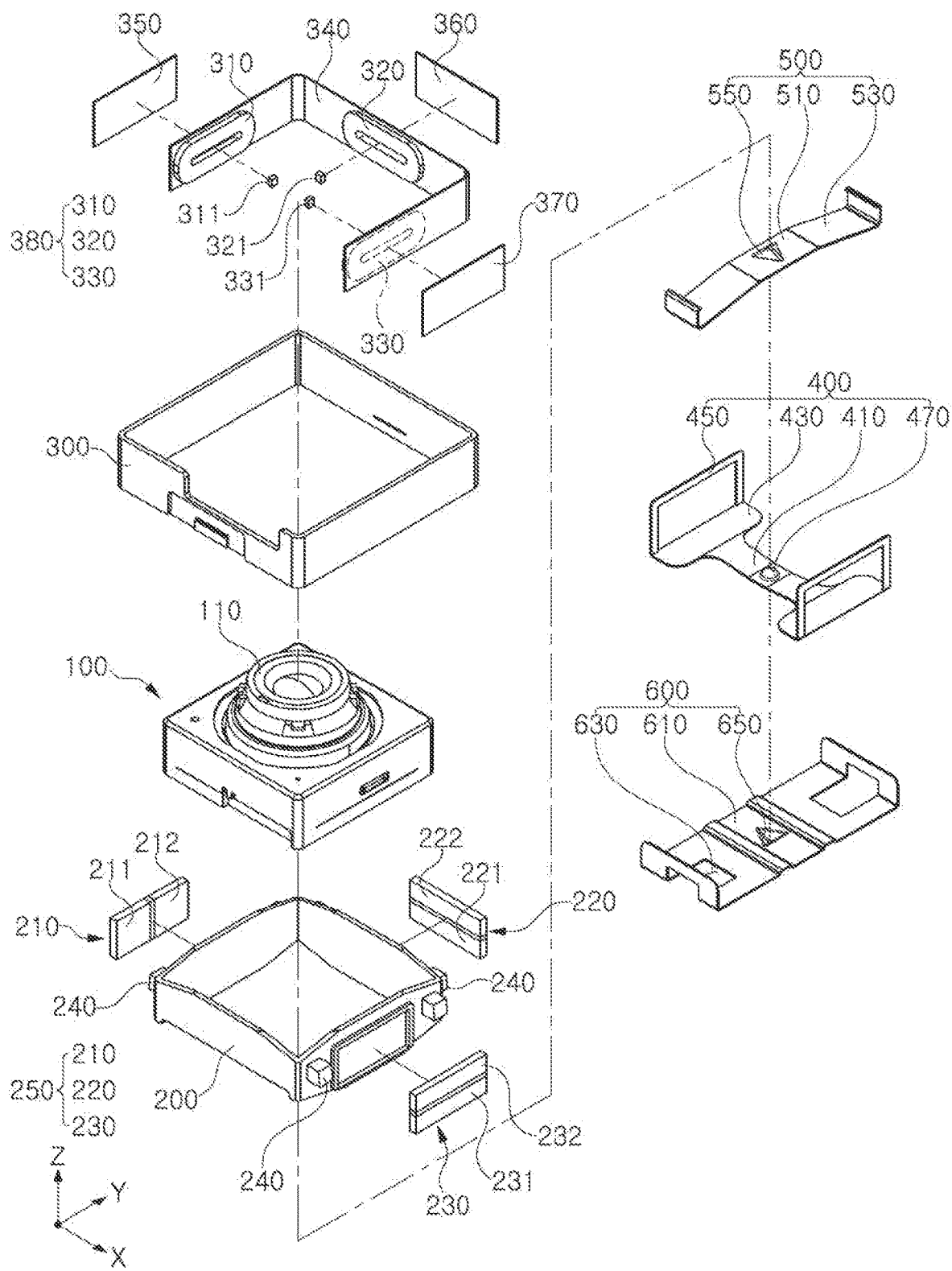
FIG. 3 is an exploded perspective view of a camera module according to an example.

FIG. 3 is an exploded perspective view of a camera module according to an example.

Figure 4:
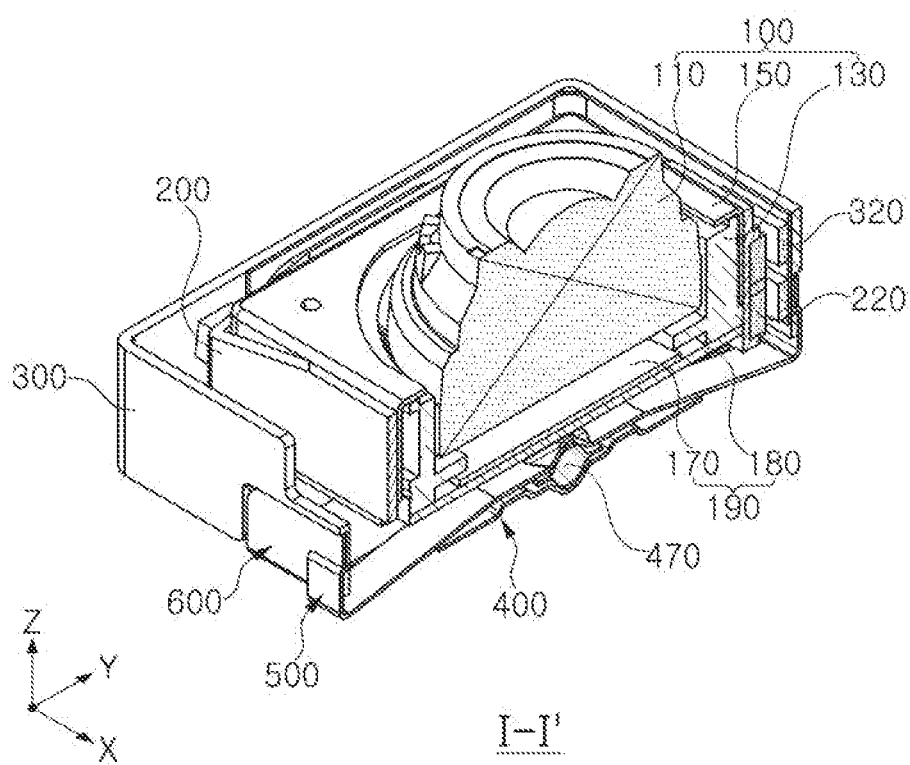
FIG. 4 is a cross-sectional view taken along line I-I' of FIG. 1.
Figure 5:
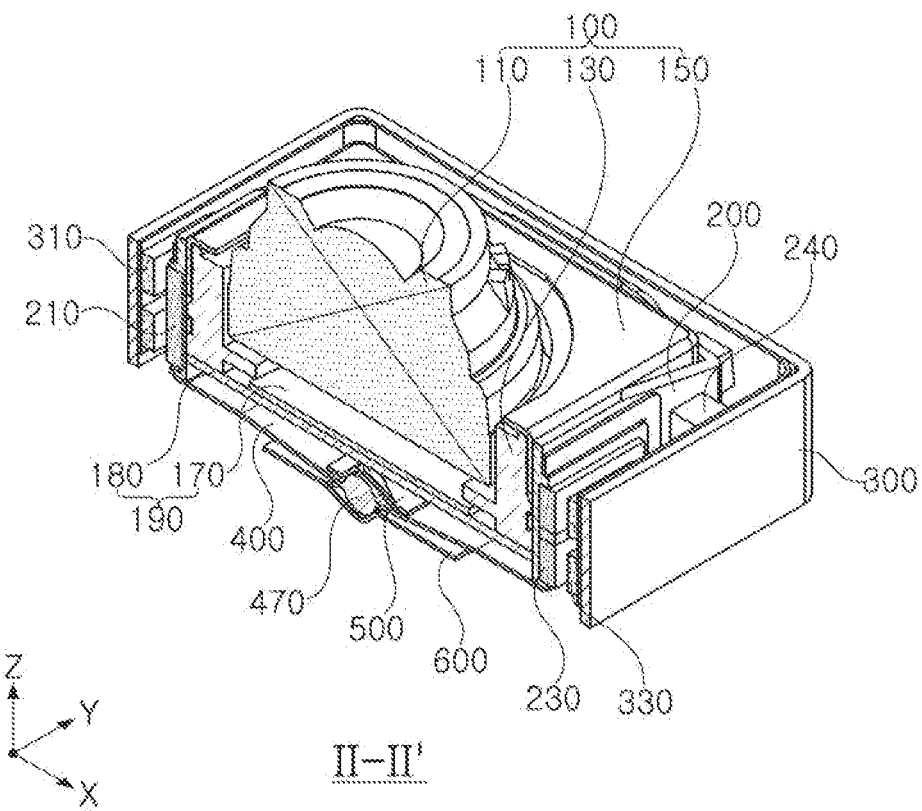
FIG. 5 is a cross-sectional view taken along line II-II' of FIG. 1.

FIG. 4 is a cross-sectional view taken line I-I' in FIG. 1, and FIG. 5 is a cross-sectional view taken along line II-II' in FIG. 1.

In FIGS. 1 to 5, a camera module, according to an example, may include a movable member 100 having a lens module 110, a holder 200 coupled with the movable member 100, a fixing frame 300 accommodating the holder 200, a movable frame 400 mounted to the holder 200, and a first support frame 500 and a second support frame 600 mounted to the fixing frame 300.

The movable member 100 may include the lens module 110 and a housing 130 accommodating the lens module 110.

The lens module 110 may indicate a lens barrel, but is not limited thereto, and may indicate a combination of a lens barrel and a carrier.

At least one lens for imaging an object may be accommodated in the lens module 110. For example, when a plurality of lenses is disposed, the plurality of lenses are mounted inside the lens module 110 along the optical axis. The lens module 110 may have a hollow cylindrical shape.

The lens module 110 may be accommodated in the housing 130. For example, the housing 130 may have a shape of which upper and lower portions are open, and the lens module 110 is accommodated in the inner space of the housing 130 (see FIGS. 4 and 5).

Although not illustrated in the drawing, an image sensor module 190 may be disposed below the housing 130.

The image sensor module 190 is a device that converts light incident through the lens module 110 into an electrical signal.

For example, the image sensor module 190 may include an image sensor 170 and a printed circuit board 180 connected to the image sensor 170, and may further include an infrared filter.

The infrared filter may serve to block light in the infrared region among the light incident through the lens module 110.

The image sensor 170 may convert light incident through the lens module 110 into an electrical signal. For example, the image sensor 170 may be a Charge Coupled Device (CCD) or a Complementary Metal-Oxide Semiconductor (CMOS).

The electrical signal converted by the image sensor 170 may be output as an image through a display unit of a portable electronic device.

The image sensor 170 may be fixed to the printed circuit board 180 and electrically connected to the printed circuit board 180 by wire bonding.

A case 150 may be coupled to an outer surface of the housing 130, and the case 150 functions to protect internal components of the camera module.

The camera module, according to an example, may rotate the movable member 100 to correct for blurred image or video shake due to factors such as a user's shaky hand when shooting an image or a video, for example.

For example, when shaking occurs when shooting an image due to a user's shaky hand, relative displacement corresponding to the shaking is transmitted to the movable member 100 to compensate for the shaking.

The movable member 100 may be provided to axially rotate in three axes.

For example, the movable member 100 may be rotated with respect to the optical axis (a Z-axis), a first axis (an X-axis), and a second axis (a Y-axis) to compensate for shaking.

In this example, the first axis (the X-axis) indicates an axis perpendicular to the optical axis (the Z-axis), and the second axis (the Y-axis) indicates an axis perpendicular to both the optical axis (the Z-axis) and the first axis (the X-axis).

A driving unit may be provided to rotate the movable member 100. The driving unit may include a magnet member 250 and a coil member 380 disposed to face each other.

For example, the magnet member 250 may include a first magnet 210, a second magnet 220, and a third magnet 230, and the coil member 380 includes a first coil 310, a second coil 320, and a third coil 330.

The magnet member 250 may be provided in the holder 200. The holder 200 may have a shape in which upper and lower portions are open, and may have four sidewalls. The first magnet 210 may be mounted on a first sidewall of the holder 200, the second magnet 220 may be mounted on a second sidewall perpendicular to the first sidewall of the holder 200, and the third magnet 230 may be mounted on a third sidewall perpendicular to the second sidewall of the holder 200. The first sidewall and the third sidewall may be sidewalls opposing each other.

The coil member 380 may be provided on the fixing frame 300. For example, the coil member 380 may be provided on one surface of a substrate 340 mounted on the fixing frame 300.

The fixing frame 300 may have a shape in which upper and lower portions are open, and may have four sidewalls. The substrate 340 may have a '⊏' shape and may be mounted on the inner surfaces of three sidewalls among the four sidewalls of the fixing frame 300.

On the other hand, yokes 350, 360, and 370 may be mounted on the other surface of the substrate 340. The yokes 350, 360, and 370 are disposed to face the magnet member 250 in a direction perpendicular to the optical axis (the Z-axis). Accordingly, the yokes 350, 360, and 370 may be disposed to face the magnet member 250 with the coil member 380 therebetween.

The yokes 350, 360, and 370 may function to focus the magnetic force of the magnet member 250. Accordingly, the occurrence of magnetic flux leakage may be prevented and/or mitigated against.

The first magnet 210 and the first coil 310 may be disposed to face each other in a direction (for example, the X-axis direction) perpendicular to the optical axis (the Z-axis), the second magnet 220 and the second coil 320 may be disposed to face each other in a direction (e.g., the Y-axis direction) perpendicular to the optical axis (the Z-axis), and the third magnet 230 and the third coil 330 may be disposed in a direction (for example, the X-axis direction) perpendicular to the optical axis (the Z-axis).

The first magnet 210 and the third magnet 230 may be respectively disposed perpendicular to the second magnet 220. In addition, the first magnet 210 and the third magnet 230 may be disposed in parallel to each other.

The first coil 310 and the third coil 330 may be respectively disposed perpendicular to the second coil 320. Also, the first coil 310 and the third coil 330 may be disposed in parallel to each other.

The first magnet 210 may include a first polarity 211 and a second polarity 212 magnetized in a direction (e.g., the Y-axis direction) perpendicular to the optical axis (the Z-axis). For example, one surface of the first magnet 210 facing the first coil 310 may include a first polarity 211 and a second polarity 212 magnetized in the Y-axis direction. The first polarity 211 may be an N-pole or an S-pole, and the second polarity 212 may be a polarity (an S-pole or an N-pole) opposite to the first polarity 211.

The second magnet 220 and the third magnet 230 may include first polarities 221 and 231 and second polarities 222 and 232 magnetized in the optical axis (Z-axis) direction, respectively. For example, one surface of the second magnet 220 facing the second coil 320 may include the first polarity 221 and the second polarity 222 magnetized in the Z-axis direction. In addition, one surface of the third magnet 230 facing the third coil 330 may include the first polarity 231 and the second polarity 232 magnetized in the Z-axis direction.

The first magnet 210 and the first coil 310 may generate driving force in a direction (e.g., Y-axis direction) perpendicular to the optical axis (the Z-axis). Therefore, the movable member 100 may be rotated with respect to the optical axis (the Z-axis) by the driving force of the first magnet 210 and the first coil 310.

The second magnet 220 and the second coil 320 may generate driving force in the optical axis (Z-axis) direction. Therefore, the movable member 100 may be rotated with respect to the first axis (the X-axis) perpendicular to the optical axis (the Z-axis) by the driving force of the second magnet 220 and the second coil 320.

The third magnet 230 and the third coil 330 may generate driving force in the optical axis (Z-axis) direction. Therefore, the movable member 100 may be rotated with respect to the second axis (the Y-axis) perpendicular to both the optical axis (the Z-axis) and the first axis (the X-axis) by the driving force of the third magnet 230 and the third coil 330.

The movable member 100 may be accommodated in the holder 200 and fixedly coupled to the holder 200. The movable member 100 and the holder 200 are accommodated in the fixing frame 300.

The holder 200 is provided with the magnet member 250, and the fixing frame 300 is provided with the coil member 380. The magnet member 250 is a moving member rotated about three axes when shaking is corrected, and the coil member 380 is a fixed member fixed to the fixing frame 300.

When power is applied to the coil member 380, the movable member 100 and the holder 200 may be rotated with respect to three axes by electromagnetic influence between the magnet member 250 and the coil member 380.

A stopper 240 may be provided on the holder 200. The holder 200 may be accommodated in the fixing frame 300 and may be rotated around three axes. The stopper 240 may reduce impact when the holder 200 rotates and collide with the fixing frame 300, and may limit the rotation range of the holder 200.

The stopper 240 may protrude from a sidewall of the holder 200 in a direction perpendicular to the optical axis (the Z-axis). For example, the stopper 240 may be disposed one on each side of each magnet.

Although the stopper 240 is illustrated to protrude from three sidewalls of the holder 200 in FIG. 3, the stopper may also protrude from four sidewalls of the holder 200.

The stopper 240 may be an elastic member.

The camera module, according to an example, may use a closed-loop control method to detect and feedback the position of the movable member 100.

Accordingly, position sensors 311, 321, and 331 may be provided for closed-loop control. The position sensors 311, 321, and 331 may be disposed in a hollow portion formed in the center of each coil. The position sensors 311, 321, and 331 may be hall sensors.

The camera module, according to an example, may include the movable frame 400, the first support frame 500, and the second support frame 600 to support the movable member 100 and the holder 200.

The movable frame 400 may be mounted on the holder 200. The movable frame 400 provides a rotation center to the movable member 100 and the holder 200 and may be rotated together with the movable member 100 and the holder 200.

For example, the movable member 100, the holder 200, and the movable frame 400 may be rotated around three axes, while being supported by the first support frame 500 and the second support frame 600.

The first support frame 500 and the second support frame 600 may be spaced apart from each other in the optical axis (the Z-axis) direction. The movable frame 400 may be disposed between the first support frame 500 and the second support frame 600.

The movable frame 400 may be mounted on the holder 200 and include a pivot portion 470. The pivot portion 470 may be a center of rotation of the movable member 100 and the holder 200 and may be a ball member. The pivot portion 470 may be provided to protrude to upper and lower portions of the movable frame 400.

The movable frame 400 may have a plate shape having a length in a direction (e.g., the X-axis direction) perpendicular to the optical axis (the Z-axis).

For example, the movable frame 400 may include a first plate 410 having the pivot portion 470 in the center and second plates 430 extending from both ends of the first plate 410.

The first plate 410 may extend in both directions of the X-axis with respect to the pivot portion 470. In addition, the first plate 410 may be provided to be inclined upward in both sides of the X-axis direction with respect to the pivot portion 470.

The second plate 430 may include a coupling portion 450 to be mounted on the holder 200.

The width of the first plate 410 may be formed narrower than the width of the second plate 430. In this case, the width may indicate the width in the Y-axis direction.

The first support frame 500 may be mounted on the fixing frame 300 and disposed to surround the upper portion of the pivot portion 470. The first support frame 500 may include a first support groove 550 and at least a portion of the upper portion of the pivot portion 470 may be accommodated in the first support groove 550. The first support groove 550 may have a tetrahedral shape with one surface open. Therefore, the pivot portion 470 and the first support groove 550 may contact each other with three contact points.

The first support frame 500 may have a plate shape having a length in a direction (e.g., Y-axis direction) perpendicular to the optical axis (the Z-axis).

For example, the first support frame 500 may include a first body portion 510 having the first support groove 550 in the center, and extension portions 530 extending obliquely from both sides of the first body portion 510. The extension portions 530 may be provided with coupling portions to be mounted on the fixing frame 300. As an example, the coupling portions may be bent from both ends of the extension portions 530.

The second support frame 600 may be mounted on the fixing frame 300 and disposed to surround the lower portion of the pivot portion 470. The second support frame 600 may include a second support groove 650 and at least a portion of the lower portion of the pivot portion 470 may be accommodated in the second support groove 650. The second support groove 650 may have a tetrahedral shape with one surface open. Therefore, the pivot portion 470 and the second support groove 650 may be in contact with each other with three contact points.

The second support frame 600 may have a plate shape having a length in a direction (e.g., the Y-axis direction) perpendicular to the optical axis (the Z-axis).

For example, the second support frame 600 may include a second body portion 610 having the second support groove 650 in the center, and through-holes 630 provided on both sides of the second body portion 610 to penetrate the second body portion 610 in the optical axis (the Z-axis) direction. The second body portion 610 may be provided with a coupling portion to be mounted on the fixing frame 300. As an example, the coupling portion may be bent from both ends of the second body portion 610.

The second body portion 610 may have guide protrusions on both sides of the second support groove 650. The first plate 410 of the movable frame 400 may be disposed between the guide protrusions.

The extension portion 530 of the first support frame 500 may be disposed to pass through the through-hole 630 of the second body portion 610 toward the lower side of the second body portion 610 of the second support frame 600 from the upper side thereof.

The first support groove 550 may be in three-point contact with the upper portion of the pivot portion 470, and the second support groove 650 may be in three-point contact with the lower portion of the pivot portion 470.

The first support groove 550 and the second support groove 650 may be staggered, based on the pivot portion 470. For example, when viewed in the optical axis (Z-axis) direction, the vertices of the first support groove 550 may be located in opposite directions of the vertices of the second support groove 650. Therefore, the pivot portion 470 may be stably supported between the first support groove 550 and the second support groove 650.

The first support frame 500 and the second support frame 600 may be supported by pressing the pivot portion 470 of the movable frame 400 disposed therebetween. Therefore, even when power is not applied to the coil member 380 or the position of the camera module is changed during the use of the camera module, the position of the movable frame 400 may be prevented from shaking.

Since the movable frame 400 is coupled to the holder 200, and the holder 200 is coupled to the movable member 100, the movable member 100 may be supported stably.

Figure 6:
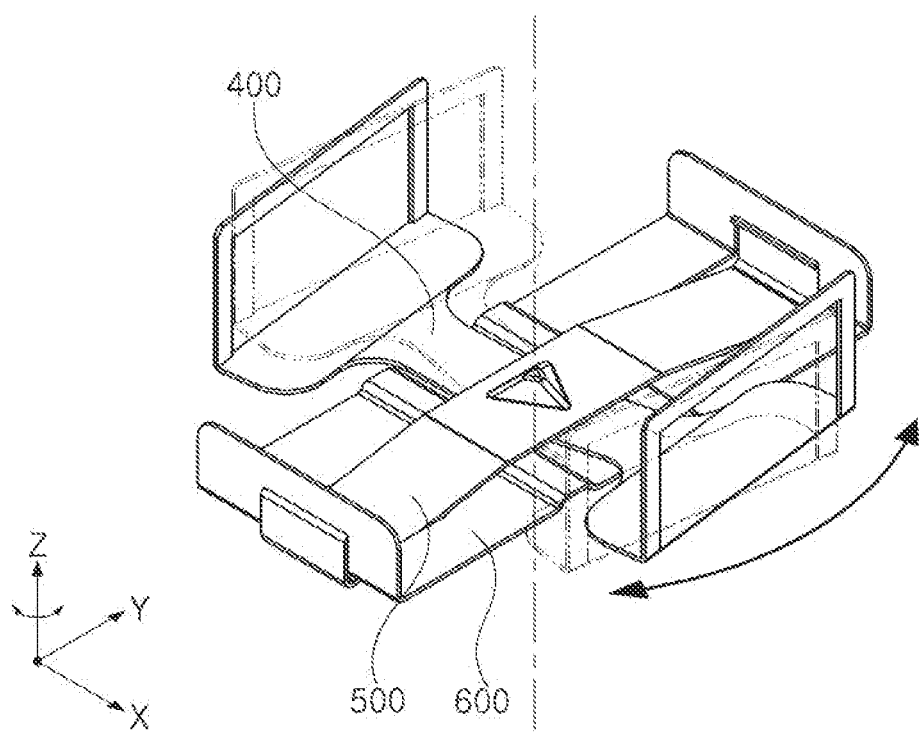
FIG. 6 is a perspective view illustrating a state in which a movable frame is rotated with respect to an optical axis.
Figure 7:
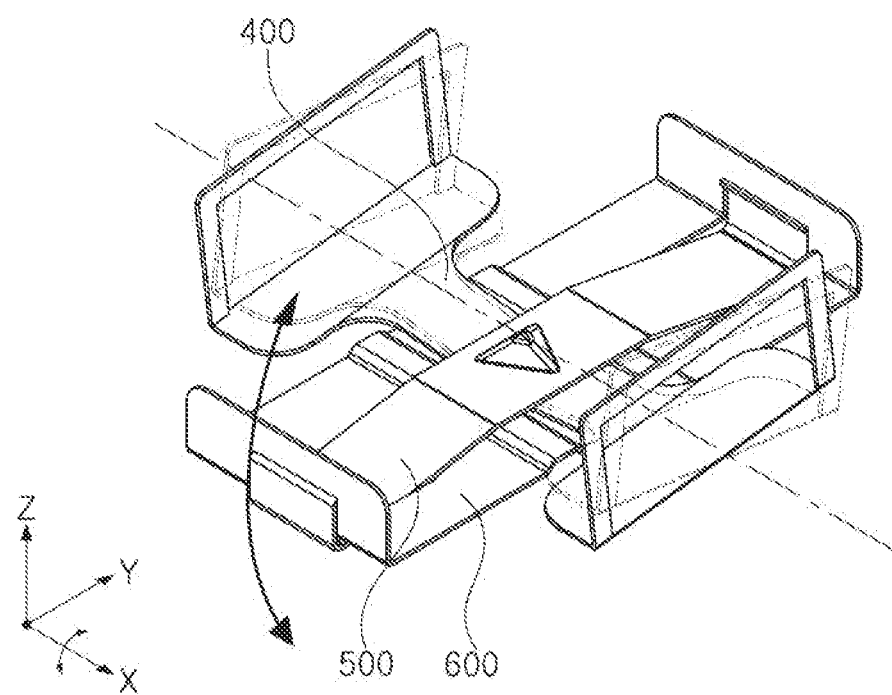
FIG. 7 is a perspective view illustrating a state in which a movable frame is rotated with respect to a first axis.
Figure 8:
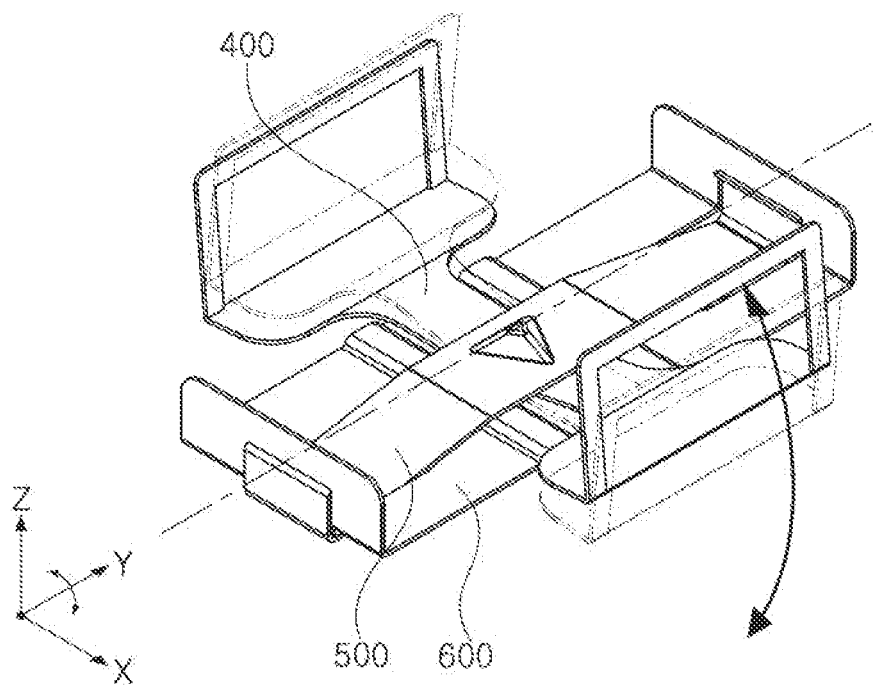
FIG. 8 is a perspective view illustrating a state in which a movable frame is rotated with respect to a second axis.

FIG. 6 is a perspective view illustrating a state in which the movable frame is rotated with respect to the optical axis, FIG. 7 is a perspective view illustrating a state in which the movable frame is rotated with respect to the first axis, and FIG. 8 is a perspective view illustrating a state in which a movable frame is rotated with respect to the second axis.

When the driving force is generated in the second axis (the Y-axis) direction by the first magnet 210 and the first coil 310, the movable frame 400 may be rotated with respect to the optical axis (the Z-axis) to compensate for the shaking (see FIG. 6).

When the driving force is generated in the direction of the optical axis (the Z-axis) by the second magnet 220 and the second coil 320, the movable frame 400 may be rotated with respect to the first axis (the X-axis) perpendicular to the optical axis (the Z-axis), to compensate for the shaking (see FIG. 7).

When the driving force is generated in the optical axis (Z-axis) direction by the third magnet 230 and the third coil 330, the movable frame 400 may be rotated with respect to the second axis (Y-axis) perpendicular to the optical axis (the Z-axis), to compensate for shaking (see FIG. 8).

Although FIGS. 6 to 8, in one example, illustrate that the movable frame 400 is rotated for the convenience of explanation, the movable frame 400 may be rotated together with the holder 200 and the movable member 100.

The lens module 110 may be moved in the optical axis (Z-axis) direction to adjust the focus. For example, the lens module 110 may be moved relative to the housing 130 in the optical axis (Z-axis) direction, while being accommodated in the housing 130.

To move the lens module 110 in the optical axis (Z-axis) direction, a magnet may be provided in the lens module 110, and a coil may be provided in the housing 130.

The magnet and the coil generating the driving force in the optical axis (Z-axis) direction may be disposed on the side on which the magnet member 250 and the coil member 380 generating the driving force for shaking correction are not disposed. Therefore, the magnetic field may be prevented from interfering.

On the other hand, the image sensor module 190 may be mounted on the movable member 100 and the housing 130, and the movable member 100 may be axially rotated with respect to three axes along with the image sensor module 190.

Since the image sensor module 190 includes the image sensor 170 and the printed circuit board 180 on which the image sensor 170 is mounted, the printed circuit board 180 on which the image sensor 170 is mounted may also be rotated, in three axes.

Accordingly, the printed circuit board 180 may be provided as a flexible circuit board and may be provided with a connection unit to exchange signals with a main board of a portable electronic device.

As set forth above, a camera module, according to an example, may have improved shaky-hand correction performance and a reduced size.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a movable member including a lens module;
a holder coupled to the movable member and including a magnet member;
a fixing frame configured to accommodate the holder and including a coil member configured to face the magnet member;
a movable frame mounted on the holder and including a pivot portion; and
a first support frame configured to surround an upper surface portion of the pivot portion and a second support frame configured to surround a lower surface portion of the pivot portion,
wherein the first support frame and the second support frame are respectively mounted on the fixing frame, and
the movable frame is rotatably disposed around the pivot portion.

2. The camera module of claim 1, wherein the movable frame is rotatable about three axes.

3. The camera module of claim 1, wherein the magnet member comprises a first magnet, a second magnet, and a third magnet, and the coil member comprises a first coil, a second coil, and a third coil,
wherein the first magnet and the first coil are configured to rotatably drive the movable frame about an optical axis,
the second magnet and the second coil are configured to rotatably drive the movable frame about a first axis, perpendicular to the optical axis, and
the third magnet and the third coil are configured to rotatably drive the movable frame about a second axis, perpendicular to both the optical axis and the first axis.

4. The camera module of claim 3, wherein the first magnet has a first polarity and a second polarity, magnetized in a direction perpendicular to the optical axis, and the second magnet and the third magnet each have a first polarity and a second polarity magnetized in the optical axis direction.

5. The camera module of claim 1, wherein the first support frame includes a first support groove having a tetrahedral shape protruding on a first surface of the first support groove and sunken on another surface of the first support groove, and the first support groove has three points in contact with the pivot portion.

6. The camera module of claim 5, wherein the second support frame includes a second support groove having a tetrahedral shape protruding on a first surface of the second support groove and sunken on another surface of the second support groove, and the second support groove has three points in contact with the pivot portion.

7. The camera module of claim 6, wherein the first support groove and the second support groove are oppositely disposed to accommodate the pivot portion.

8. The camera module of claim 1, wherein the first support frame and the second support frame are press the pivot portion.

9. The camera module of claim 1, wherein the first support frame comprises a first body portion having a first support groove surrounding the pivot portion, and an extension portion extending obliquely from both sides of the first body portion,
the second support frame comprises a second body portion having a second support groove surrounding the pivot portion and a through-hole provided in the second body portion, and
the extension portion passes through the through-hole from an upper side of the second body portion towards a lower side of the second body portion.

10. The camera module of claim 1, wherein the movable frame extends in a first axis direction perpendicular to an optical axis, and
the first support frame and the second support frame respectively extend in a second axis direction perpendicular to both the optical axis and the first axis.

11. The camera module of claim 1, wherein the pivot portion is configured to have a spherical shape.

12. The camera module of claim 1, wherein the holder comprises a stopper portion protruding in a direction perpendicular to an optical axis.

13. The camera module of claim 1, wherein the movable member comprises a housing configured to accommodate the lens module, and
the lens module is disposed to be movable relative to the housing in an optical axis direction.

14. A camera module comprising:
a movable member including a lens module;
a holder coupled to the movable member and having a magnet member;
a fixing frame configured to accommodate the holder and including a coil member configured to face the magnet member;
a first support frame and a second support frame mounted on the fixing frame and spaced apart from each other along an optical axis; and
a movable frame mounted on the holder and disposed between the first support frame and the second support frame,
wherein the movable frame is provided with a ball member protruding to respectively contact the first support frame and the second support frame, and
the movable frame is rotatably disposed, along with the movable member and the holder, around the ball member.

15. The camera module of claim 14, wherein the movable frame, together with the movable member and the holder, is rotatable about three axes,
the movable member comprises a housing configured to accommodate the lens module, and
the lens module is disposed to be movable relative to the housing in the optical axis direction.

16. The camera module of claim 15, wherein the housing is provided with an image sensor module coupled thereto,
wherein the image sensor module comprises an image sensor and a printed circuit board on which the image sensor is mounted, and
the image sensor module, together with the movable member, is rotatable about three axes.

* * * * *